(12) United States Patent
Rittershofer et al.

(10) Patent No.: US 10,390,491 B2
(45) Date of Patent: Aug. 27, 2019

(54) CLEANING SHOE VENTING THROUGH CHOPPER ROTOR ASSEMBLY

(71) Applicant: Deere & Company, Moline, IL (US)

(72) Inventors: Martin Rittershofer, Kaiserslautern (DE); Gregor Diessner, Schweigen-Rechtenbach (DE); Oliver Klein, Saarlouis (DE); Peter Mischler, Kaiserslautern (DE); Volker Fuchs, Bettendorf, IA (US); Corwin M. Puryk, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 18 days.

(21) Appl. No.: 15/621,244

(22) Filed: Jun. 13, 2017

(65) Prior Publication Data
US 2018/0352748 A1  Dec. 13, 2018

(51) Int. Cl.
| | |
|---|---|
| A01F 12/40 | (2006.01) |
| A01F 12/48 | (2006.01) |
| A01D 41/127 | (2006.01) |
| A01D 41/12 | (2006.01) |
| A01F 12/44 | (2006.01) |

(52) U.S. Cl.
CPC .......... *A01F 12/40* (2013.01); *A01D 41/1243* (2013.01); *A01D 41/1276* (2013.01); *A01F 12/48* (2013.01); *A01D 41/1271* (2013.01); *A01F 12/444* (2013.01)

(58) Field of Classification Search
CPC ............................ A01F 12/40; A01D 41/1243
See application file for complete search history.

(56) References Cited

U.S. PATENT DOCUMENTS

| | | | | |
|---|---|---|---|---|
| 3,103,241 A | * | 9/1963 | Weigel | A01F 12/40 |
| | | | | 241/190 |
| 4,913,679 A | * | 4/1990 | Bender | A01F 12/40 |
| | | | | 414/505 |

(Continued)

FOREIGN PATENT DOCUMENTS

WO        8800432 A1    1/1988

OTHER PUBLICATIONS

Extended European Search Report; European Patent Office; dated Oct. 31, 2018; pp. 1-7.

*Primary Examiner* — Alicia Torres
(74) *Attorney, Agent, or Firm* — Taft Stettinius & Hollister LLP; Stephen F. Rost

(57) ABSTRACT

A combine harvester includes a housing having a rear hood and defining an interior, a blower for generating an air stream in a substantially rearward direction, and a cleaning system separating residue from a crop material such that the residue is transported via the air stream rearwardly to be discharged from the housing. A chopper rotor assembly is disposed within the interior below the rear hood and includes a chopper rotor having a plurality of blades for chopping the residue as it is received via the air stream. A chopper housing is disposed within the interior and includes a roof structure located above the chopper rotor such that a minimal gap is defined therebetween. The air stream flows out of the interior via a flow path defined through the chopper rotor without being substantially redirected from flowing in the rearward direction by the plurality of blades of the chopper rotor.

20 Claims, 6 Drawing Sheets

(56) References Cited

U.S. PATENT DOCUMENTS

| | | |
|---|---|---|
| 7,008,315 B2 | 3/2006 | Redekop et al. |
| 7,354,341 B1 | 4/2008 | Smith et al. |
| 7,544,126 B2 | 6/2009 | Lauer et al. |
| 8,118,651 B2 | 2/2012 | Weichholdt et al. |
| 2002/0119809 A1 | 8/2002 | Bognar et al. |
| 2006/0073860 A1* | 4/2006 | Redekop ............ A01D 41/1243 460/112 |
| 2010/0184494 A1* | 7/2010 | Klein ................ A01D 41/1243 460/112 |

* cited by examiner

CLEANING SHOE VENTING THROUGH CHOPPER ROTOR ASSEMBLY

FIELD OF THE DISCLOSURE

The present disclosure relates to a combine harvester, and in particular, to a residue disposal system and venting system of an enclosed combine body.

BACKGROUND

Agricultural machines, such as a combine, include different portions or sections for moving crop therethrough. For example, a conventional combine may include a cleaning shoe or system that is located between the wheels of the combine, behind the cab and below the engine. The design of the cleaning system is such that a large fan or blower provides air driven upward therefrom. The cleaning system may include grating in the form of a large cylindrical or semi-circular body through which grain and other residue falls through and onto a cleaning shoe (or sieve). Air from the blower is generated upward through the flat grating and cleaning shoe and lifts material other than grain ("MOG") such as straw and carries the material to the rear of the combine on a flow of air. Grain that falls through a large flat screen of the cleaning system may collect near a bottom of the combine where it is lifted up by the air flow and deposited into a grain tank. The MOG is further carried by the air flow over the top of the sieve and to the rear of the combine where it is deposited onto the underlying ground. In effect, this performs the cleaning function of the combine. The MOG, which is carried by the air flow to the rear of the combine, may be spread on the ground or otherwise deposited on the ground in a narrow windrow or swath where it is later picked up.

The combine further includes a straw chopper or chopper assembly located between the sieve and the rear outlet of the combine. The chopper assembly may be formed by a large cylinder with blades or knives protruding therefrom, thereby forming a chopper rotor. The chopper assembly rotates and shreds or chops the residue or MOG before it exits the combine.

During operation, the blower generates a substantial amount of air flow to carry the MOG to the chopper assembly. The amount of air generated by the blower is significant, and in effect it can cause back pressure inside the combine if it is unable to escape or vent from the enclosed combine body. Conventional combine designs include vents upstream of the chopper assembly to allow air to vent or escape from the combine to reduce back pressure.

One such example of venting air is described in U.S. Pat. No. 7,008,315 to Redekop Chaff Systems Ltd. (hereinafter "the '315 patent"). The '315 patent describes a chopper housing formed by side walls at opposite sides of a combine hood. The housing further includes a top wall and a bottom wall that define an inlet which straw and other material passes through to a chopper rotor. As shown in FIG. 2 of the '315 patent, the top wall of the housing includes a vertical portion which extends downwardly and a curved section that extends around the top of the rotor to a rear edge which is directly to the rear of the rotor. In other words, the '315 patent shows and describes a shroud or metal sheet which is formed around or circumscribes all sides, including the rear or back side, of the chopper rotor. Due to a buildup of back pressure in the combine, the '315 patent further illustrates and describes a combine with rear vents and side vents defined in the chopper housing. The vents form a series of horizontal parallel slots and consist of louvers that are angled outwards and upwards. Moreover, the vents are above and forward of the inlet of the chopper housing so as to act on the air in advance of the materials entering the inlet of the chopper rotor. Thus, the '315 patent describes a combine in which air is permitted to vent or escape from the combine at a location above and upstream of the chopper rotor.

In addition to the rear vents and side vents, the '315 patent further describes the chopper rotor as including a hub with a plurality of radially extending blades which rotate and are arranged across the width of the chopper rotor. The blades are configured to generate an air flow by pushing the air rearward toward an outlet of the rotor housing. During operation, the blades rotate about the hub and push the air to follow a generally circular path around the chopper rotor.

Combine harvester designs similar to the one described in the '315 patent, however, have been found to restrictive to air flow. The vents upstream of the chopper rotor facilitate some venting, but there is still an issue with back pressure building in the combine even with these vents. Moreover, air flow is further restricted with chopper rotor housings similar to the one in the '315 patent in which sheet metal or a shroud is formed in close proximity around the top and rear of the chopper rotor. Due to the close proximity of the shroud to the blades of the chopper rotor, the air flow is configured to follow the rotational path of the blades. Although the blades, which may be formed like paddles or fan blades, facilitate some air flow through an outlet of the chopper housing, the air flow is still restricted by the design of the chopper housing and the fan blades cause some of the air to flow forward back into the combine thus building back pressure. Thus, there is a need for a less restrictive chopper housing design that facilitates better air flow through an outlet of the chopper housing and which reduces back pressure in the combine.

SUMMARY

In one embodiment of the present disclosure, a combine harvester includes a housing including a rear hood and opposite side walls which define an interior; a blower disposed in the interior of the housing, the blower configured to generate an air stream in a substantially rearward direction; a cleaning system disposed in the interior at a location rearward of the blower, the cleaning system separating residue from a crop material such that the residue is transported via the air stream rearwardly to be discharged from the housing; a chopper rotor assembly disposed within the interior at a location below the rear hood of the housing, the chopper rotor assembly comprising a chopper rotor mounted about a hub for rotation about an axis defined by the hub and a plurality of blades coupled to the hub of the chopper rotor for chopping the residue as it is received via the air stream; a chopper housing disposed within the interior and defining an inlet opening of the chopper rotor assembly for receiving the residue being transported via the air stream from the cleaning system and an outlet spaced rearward from the chopper rotor for discharge of the chopped residue from the interior of the housing; and a roof structure of the chopper housing located above the chopper rotor, the roof structure being disposed in close proximity to the chopper rotor such that a minimal gap is defined therebetween; wherein, the air stream generated by the blower flows out of the interior via a flow path defined through the chopper rotor without being substantially redirected from flowing in the rearward direction by the plurality of blades of the chopper rotor.

In one example of this embodiment, due to the size of the gap defined between the roof structure and chopper rotor, the air stream flows through the chopper rotor to be discharged from the interior without flowing above the chopper rotor and through the gap. In a second example, the gap may be less than two inches. In a third example, the chopper housing may include a floor and a pair of side walls opposite one another, the chopper housing being open at the rear of the chopper rotor to permit the air stream to flow substantially unrestricted through the chopper rotor and out of the interior. In a fourth example, the rear hood is free of any opening or vent such that the air flow is directed rearward via the rear hood without escaping from the interior upstream of the chopper rotor. In a fifth example, the housing may not include a vent between the cleaning system and the chopper rotor for venting the air stream upstream of the chopper rotor.

In a sixth example, each of the plurality of blades is substantially straight and includes a substantially flat profile so as to chop the residue without producing an additional air stream as the chopper rotor rotates about the hub. In a seventh example, the chopper rotor does not include any fan blades coupled to the hub. In an eighth example, at least one fan blade may be coupled to the hub of the chopper rotor, the at least one fan blade including a bent portion for generating an additional air stream in the interior of the housing. In a ninth example, the roof structure is coupled to the side walls of the chopper housing or the side walls of the housing.

In another example of this embodiment, the roof structure may include a first section and a second section that converge at a lowermost point to form a substantially V-shaped structure. Moreover, the gap is defined between the lowermost point and the chopper rotor. In a further example, the roof structure includes a first section that is substantially flat, the gap being defined between the first section and the chopper rotor. In yet a further example, the roof structure may include a second section that is coplanar with the rear hood.

In another embodiment of the present disclosure, a combine harvester includes a housing including a rear hood and opposite side walls which define an interior; a blower disposed in the interior of the housing, the blower configured to generate an air stream in a substantially rearward direction; a cleaning system disposed in the interior at a location rearward from the blower, the cleaning system separating residue from a crop material such that the residue is transported via the air stream rearwardly to be discharged from the housing; a chopper rotor assembly disposed within the interior at a location below the rear hood of the housing, the chopper rotor assembly comprising a chopper rotor mounted about a hub for rotation about an axis defined by the hub and a plurality of blades coupled to the hub of the chopper rotor for chopping the residue as it is received via the air stream; each of the plurality of blades being substantially straight and comprising a substantially flat profile so as to chop the residue without producing an additional air stream as the chopper rotor rotates about the hub; a chopper housing disposed within the interior and defining an inlet opening of the chopper rotor assembly for receiving the residue and an outlet spaced rearward from the chopper rotor for discharge of the chopped residue from the interior of the housing; and a roof structure of the chopper housing located above the chopper rotor, the roof structure being disposed in close proximity to the chopper rotor such that a minimally-sized gap is defined therebetween; wherein, the air stream generated by the blower flows into the chopper housing via the inlet, through the chopper rotor without being substantially redirected from flowing in the rearward direction by the plurality of blades of the chopper rotor, and out of the interior via the outlet.

In one example of this embodiment, the chopper housing may include a floor and a pair of side walls opposite one another, the chopper housing being open at the rear of the chopper rotor to permit the air stream to flow substantially unrestricted through the chopper rotor and out of the interior. In another example, the housing may not include a vent between the cleaning system and the chopper rotor for venting the air stream upstream of the chopper rotor. In yet another example, the chopper rotor does not include any fan blades coupled thereto.

In a further embodiment of the present disclosure, a combine harvester includes a housing including a rear hood and opposite side walls which define an interior; a blower disposed in the interior of the housing, the blower configured to generate an air stream in a substantially rearward direction; a cleaning system disposed in the interior at a location rearward from the blower, the cleaning system separating residue from a crop material such that the residue is transported via the air stream rearwardly to be discharged from the housing; a chopper rotor assembly disposed within the interior at a location below and rearward of the rear hood of the housing, the chopper rotor assembly comprising a chopper rotor mounted about a hub for rotation about an axis defined by the hub and a plurality of blades coupled to the hub of the chopper rotor for chopping the residue as it is received via the air stream; a chopper housing disposed within the interior and defining an inlet opening of the chopper rotor assembly for receiving the residue and an outlet spaced rearward from the chopper rotor for discharge of the chopped residue from the interior of the housing, the chopper housing including a floor, a pair of side walls, and being substantially open at the rear of the chopper rotor; and a roof structure of the chopper housing located above the chopper rotor and coupled to either the housing or the chopper housing, the roof structure being disposed in close proximity to the chopper rotor such that a minimally-sized gap is defined therebetween; wherein, the air stream generated by the blower flows out of the interior via a flow path defined through the chopper rotor without being substantially redirected from flowing in the rearward direction by the plurality of blades of the chopper rotor; wherein, the housing does not include a vent between the cleaning system and the chopper rotor for venting the air stream upstream of the chopper rotor.

In an example of this embodiment, each of the plurality of blades may be substantially straight and include a substantially flat profile so as to chop the residue without producing an additional air stream as the chopper rotor rotates about the hub.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
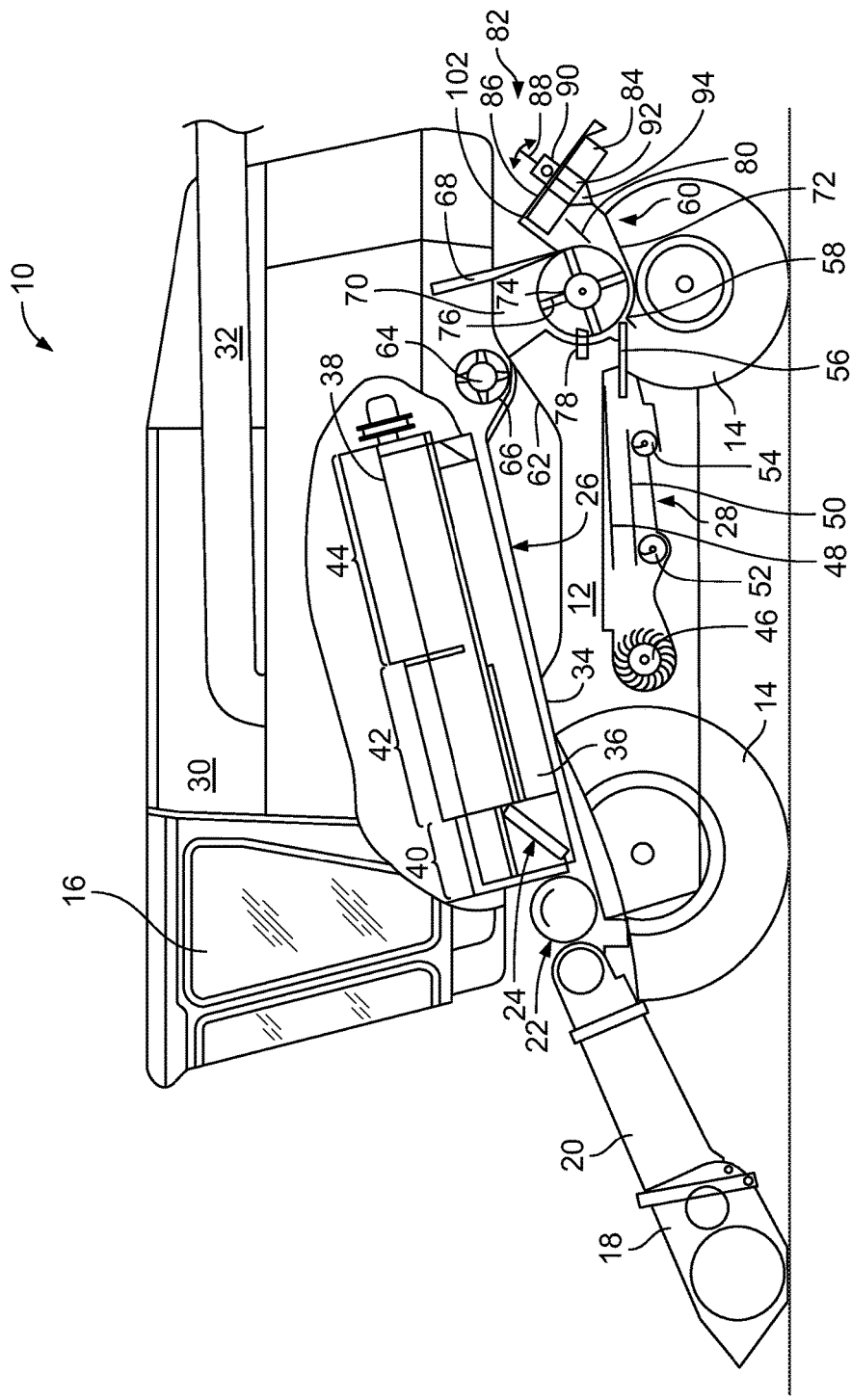
FIG. 1 is a partial section of a side view of a combine with a chopper rotor assembly and cleaning system.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an embodiment of an agricultural combine 10 is shown with a chassis 12 with wheels 14 in contact with the ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls (not shown) for controlling the operation of the combine 10. A cutter head 18 is disposed at a forward end of the combine 10 and is used in order to harvest crop such as corn and to conduct it to a slope conveyor 20. The harvested crop is conducted by a guide drum 22 to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by means of an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by means of an oscillating sheet conveyor 56 to the rear and to a lower inlet 58 of a chopper rotor assembly 60.

The aforementioned blower 46 produces an air flow that carries much of the chaff and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

Figure 2:
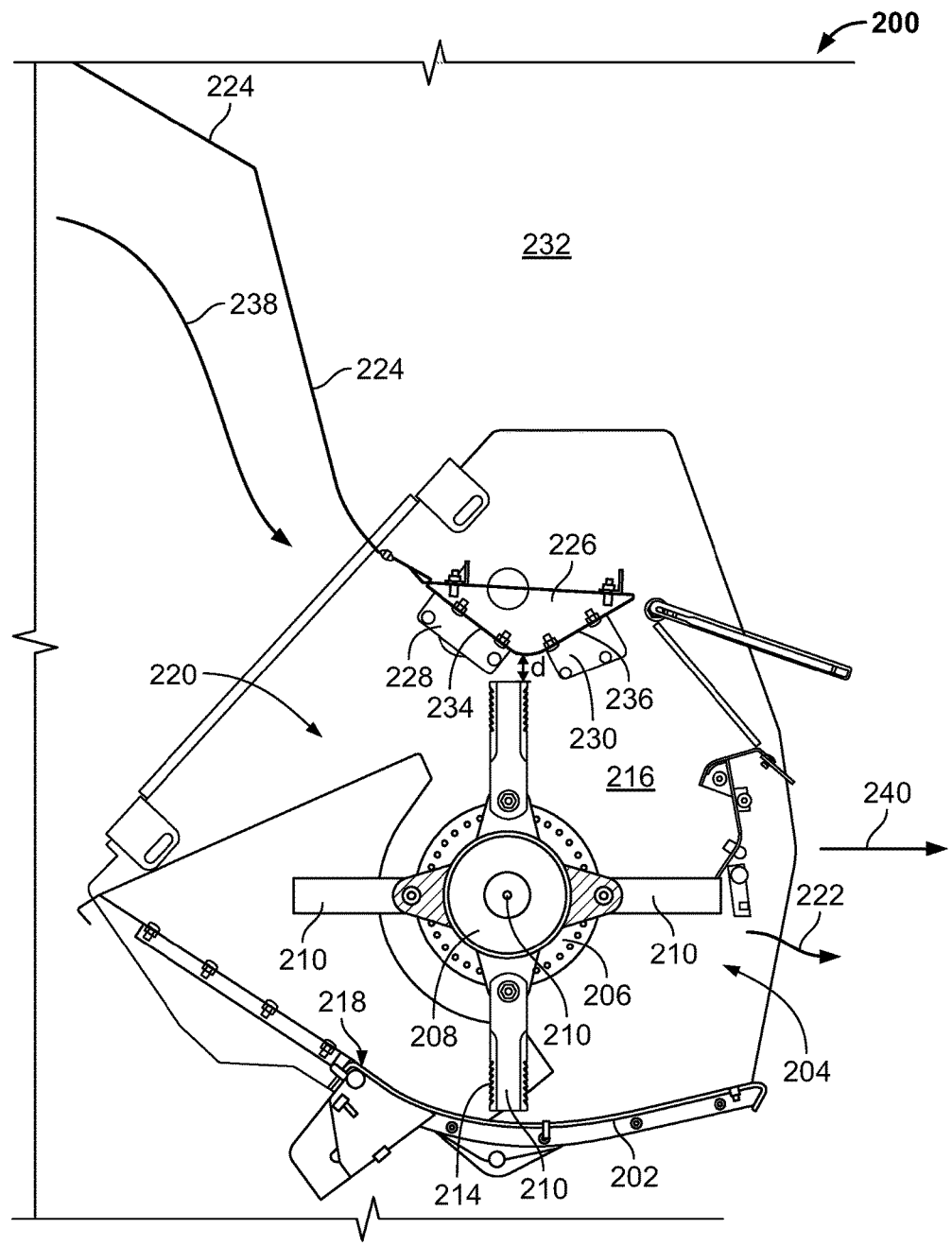
FIG. 2 is a partial section of a side view of a rear portion of a combine with an angularly shaped chopper roof structure.

Referring to FIG. 2, a rear portion of a combine 200 is shown. In particular, a chopper housing 202 and a chopper rotor assembly 204 are illustrated. The chopper housing 202 may be formed of a pair of opposing side walls 216. In FIG. 2, only one side wall 202 is shown and the other is removed to better illustrate the features of the combine inside of the chopper housing 202. In addition to the side walls 216, the housing 202 may include a floor or inlet floor 218. The inlet floor 218 may be angled or declined such that air is able to flow over the inlet floor 218 and into the chopper rotor assembly 204. The inlet floor 204 defines a portion of an inlet 220 to the chopper housing 202.

The combine 200 may include a roof or rear hood 224 which is disposed forward of the chopper rotor assembly 224. Air from the separating section 44 and the sieves 48, 50 may be directed into contact or toward the rear hood 206. As shown, the rear hood 224 may be angled or oriented in a downward and rearward direction in FIG. 2 thereby directing the air flow towards the inlet 220 of the chopper housing 202.

The combine 200 may further include side walls 232 which, in combination with at least the rear hood 224, defines an interior thereof. The side walls 216 of the chopper housing 202 may be complementary with and generally coplanar with the side walls 232 of the combine 200. In other words, the chopper housing 202 may have a similar width as that of the combine 200. Although not shown, the chopper housing 202 may be slidably coupled to one or more rails which are mounted to the side walls 232 of the combine 200. The chopper housing 202 may be moved along the rails (not shown) in order to complete service of the chopper housing 202, or if a different residue distribution is desired.

The chopper rotor assembly 204 may include a chopper rotor 206 for chopping the residue received from the cleaning system. The chopper rotor 206 may include a central hub 208 and a plurality of blades 212 coupled thereto and protruding radially therefrom. Each of the plurality of blades 212 may be spaced relative to one another in an arrangement along the width of the chopper rotor 206. The chopper rotor 206 is disposed within the chopper housing 202 and may rotate in a counterclockwise direction about a pivot axis 210. The outer edge of the plurality of blades 212 define an outer circumference or boundary during rotation. Each of the plurality of blades 212 may include a sharpened portion with a plurality of teeth 214 for chopping the residue received from the cleaning system 28. In the embodiment of FIG. 2, there are teeth 214 on both sides of each blade 212. In other embodiments, however, there may only be teeth formed on the side of the blade configured to come into contact with the residue as the chopper rotor 206 rotates in the counterclockwise direction about the pivot axis 210.

Although not shown in FIG. 2, in one embodiment the chopper rotor assembly 204 may also include one or more stationary blades affixed to the inlet floor 218 of the chopper housing 202. In this embodiment, the stationary blades may be arranged in a direction of the width of the chopper rotor 206 and spaced accordingly such that the stationary blades do not come into contact with the blades 212 of the chopper rotor 206. Interaction between the plurality of blades 212 of the chopper rotor 206 and the stationary blades can create a chopping action. In the illustrated embodiment of FIG. 2, however, there are no stationary blades shown.

Figure 3:
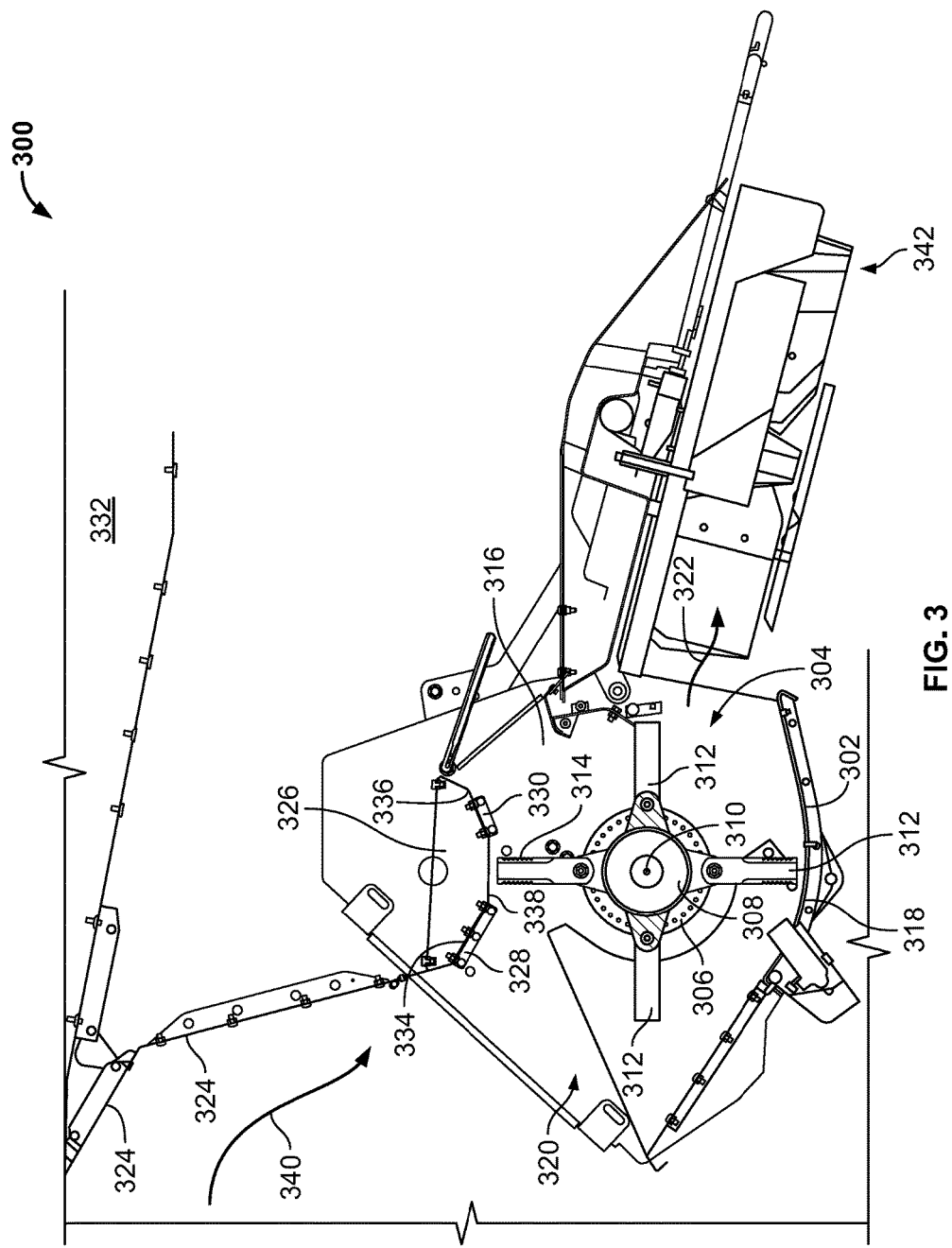
FIG. 3 is another partial section of a side view of a rear portion of a combine with a partially flat chopper roof structure.

As material is chopped by the chopper rotor 206, the material or residue is blown further rearward through an outlet or discharge outlet 222 of the chopper housing 202 until it is engaged by a spreader 342 (FIG. 3). The spreader 342 may include one or more blades or paddles for spreading the material rearward of the combine 200 where the material may be collected or picked up by another machine or vehicle. Any known type of spreader or tailboard may be used for purposes of this disclosure.

As previously described relative to the '315 patent, some conventional combines include a rear hood with vents formed therein. The '315 patent, for example, describes rear vents defined in the rear hood upstream of the chopper rotor. While the vents are designed to allow air to escape from the enclosed combine, at least in some instances only a small portion of the air is able to vent while a majority of the air is restricted from flowing out of the combine and thus back pressure builds therein.

To overcome this and referring again to FIG. 2, the present disclosure does not include any rear vents defined in the rear hood similar to those in the '315 patent. In other words, there is no means for venting air from the enclosed combine 200 upstream of the chopper rotor assembly 204 through the rear hood 224. In at least one embodiment, there may be no vent located downstream from the cleaning system 28 and upstream of the chopper rotor 206. Instead, air flow is forced to flow through the chopper rotor 206 and discharge through the outlet 222 of the chopper housing 202. As shown, air generated by the blower 46 may follow a first portion of a flow path defined by arrow 238. The flow path may partially be defined along the rear hood 224 and it also may flow along the floor inlet 218. The entirety of the air flow from the blower 46 therefore passes through the inlet 220 of the chopper housing 202 and out of the interior of the combine 220 via a second flow path 240, which is contrary to the combine design described in the '315 patent.

In the embodiment of FIG. 2, the chopper housing 202 may further include a chopper roof structure 226 which is located above the chopper rotor 206. The chopper roof structure 226 may have a substantially V-shaped cross-section as shown in FIG. 2. The structure 226 may be formed by a first section 234 and a second section 236. The first section 234 may be angled downwardly and in a rearward direction. Further, the first section 234 may be aligned coplanarly with the rear hood 224 such that there is little to no gap between the chopper roof structure 226 and the rear hood 224. A first mounting bracket 228 may be used to couple the first section 234 of the chopper roof structure 226 to the chopper housing side walls 216. Alternatively, the first mounting bracket 228 may couple the first section 234 of the chopper roof structure 226 to the side walls 232 of the combine 200.

The second section 236 of the chopper roof structure 226 may be angled upwardly and in the rearward direction. A second mounting bracket 230 may couple the second section 236 of the chopper roof structure 226 to the side walls 216 of the chopper housing 202. Alternatively, the second mounting bracket 230 may couple the second section 236 of the chopper roof structure 226 to the side walls 232 of the combine 200.

The first section 234 and the second section 236 may converge at a lowermost edge of the chopper roof structure 226 to form the substantially V-shaped cross-section depicted in FIG. 2. Moreover, the lowermost edge of the chopper roof structure 226 is in close proximity to the outer edge of the circumferential path traveled by the blades 212 of the chopper rotor 206. The chopper roof structure 226 extends across a top of the chopper rotor 206 and effectively closes off the area above the chopper rotor 206. This is shown in FIG. 2 by a small air gap or space, d, that exists between the blade 212 of the chopper rotor 206 and the chopper roof structure 226. In one non-limiting example, the space between the chopper roof structure 226 and the chopper rotor 206 may be less than 1-2 inches. This space is minimized and only exists for tolerance reasons. Otherwise, it is desired to minimize this space so that the space is sized such that the blades 212 rotate past the chopper roof structure 226 in such close proximity but without coming into contact with the lowermost edge of the chopper roof structure 226.

It is noteworthy that the chopper housing 202 does not include a shroud or section of sheet material that wraps around the chopper rotor 206 particularly at the rear of the chopper rotor 206. Instead, the chopper housing 202 is open rearward of the lowermost edge of the chopper roof structure 226 and to the rear of the chopper rotor 206 to permit air flow to escape the combine 200 from within. This open-style chopper housing 202 reduces or prevents back flow of air and thus reduces or eliminates back pressure from building inside the combine housing.

The design of the chopper housing 202 and chopper rotor 206 directs the air flow generated by the blower 46 to flow from the cleaning system 28 through the chopper rotor 206. From this design, the air flow does not bypass the chopper rotor 206, but rather flows through the inlet 220 of the chopper housing 202, through the chopper rotor 206, and discharges through the outlet 222 of the chopper housing 202. As described above, the discharge of air through the outlet 222 of the chopper rotor 206 and chopper housing 202 is shown via the second flow path identified by arrow 240 in FIG. 2. Conventional combines, such as the one described in the '315 patent, allow some air to escape from inside the combine but only through a portion of the chopper rotor. One reason for this is because most conventional chopper rotors utilize fan blades across the width of the chopper rotor. These fan blades, also commonly referred to as wing knives or wing blades, rotate in a counterclockwise direction. Thus, as air is directed by the blower to the conventional chopper rotor, the fan blades are designed with a portion of each blade bent at nearly a right angle to generate an additional air stream. In other words, as the conventional chopper rotor rotates in the counterclockwise direction, the fan blades at approximately the 9 o'clock position are able to push the air out of the combine due to the bent portion. In particular, these fan blades are able to push the air out of the combine from roughly the 9 o'clock position to approximately the 5 o'clock position.

However, for roughly 50-65% of the rotational path of each blade, the air is pushed by these fan blades forward and back into the combine. For example, from approximately the 5 o'clock position and rotating counterclockwise to the 9 o'clock position, the fan blades direct the air forward and back into the combine, thus reducing or preventing a significant portion of the air flow from escaping from the combine. This forward pushing of the air by the chopper rotor fan blades is further exacerbated by the shape of the chopper housing in the '315 patent, and particularly how it wraps around the top and rear of the chopper rotor in close proximity to the circumferential path traveled by the blades. This design of the chopper housing and use of fan blades therefore requires the rear and side vents as shown and described in the '315 patent to avoid significant back pressure from building therein.

In the present disclosure, the combine 200 of FIG. 2 is shown and described as having an open-style chopper housing 202 which does not wrap around to the rear of the chopper rotor 206. Instead and as described above, the air flow is able to flow through the chopper rotor 206 in an uninhibited manner before escaping through the outlet 222 once it flows past the lowermost edge of the chopper roof structure 226.

Figure 6:
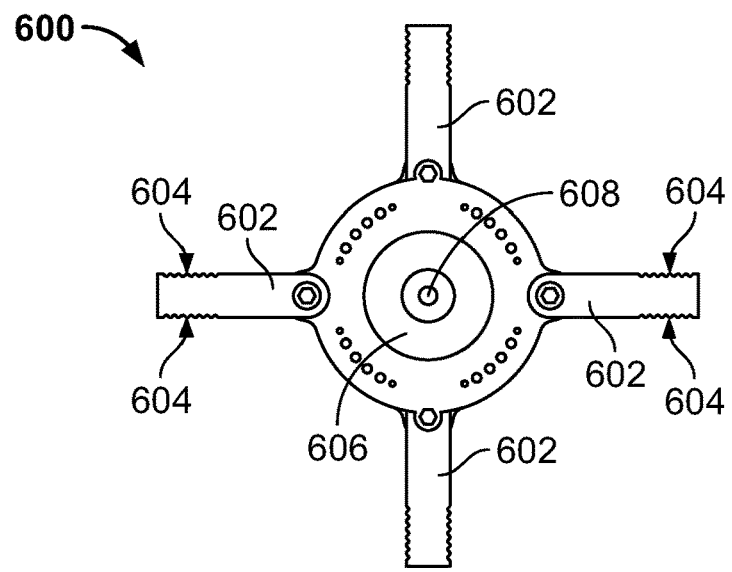
FIG. 6 is a front view of a first embodiment of a chopper rotor assembly.

In addition, the present disclosure further provides for air flow to pass through the chopper rotor 206 where the blades 212 do not inhibit the air flow or produce an additional air stream unlike conventional combines. This may be achieved by the chopper rotor assembly 204 having substantially thin, flat blades similar to those shown in FIG. 6. In FIG. 6, one embodiment of a chopper rotor 600 is illustrated having a central hub 606 and an axis 608 by which a plurality of thin, flat blades 602 are attached. The blades 602 may include a sharpened portion 604 with teeth for performing a chopping function. Each blade 602 may be substantially straight, and unlike the fan blades, there is no portion of these blades 602 that is bent or turned at an angle to promote air movement. Since these blades 602 are designed as being thin and having a substantially flat and straight profile, rotation of the blades 602 about the rotation axis of the chopper rotor 600 does not promote or push air in any direction, but instead only performs the chopping function. Thus, air flow through the chopper rotor 600 is possible in a substantially rearward direction without the blades 602 generating an additional air stream due to their substantially flat profile.

The embodiments of FIGS. 2 and 6 of the present disclosure therefore promotes air flow through the chopper rotor 206 without restricting or limiting the flow. There is no venting arrangement defined upstream of the chopper rotor 206 as is commonly found in conventional combines such as the one described in the '315 patent. Moreover, the open-style chopper housing 202 allows air to escape without having to pass around the top and rear of the chopper rotor, and there is little to no restriction of air flow which is commonly found in conventional combines. Thus, the combine 200 of FIG. 2 with the chopper rotor of FIG. 6 provides an improvement over conventional combines.

Figure 7:
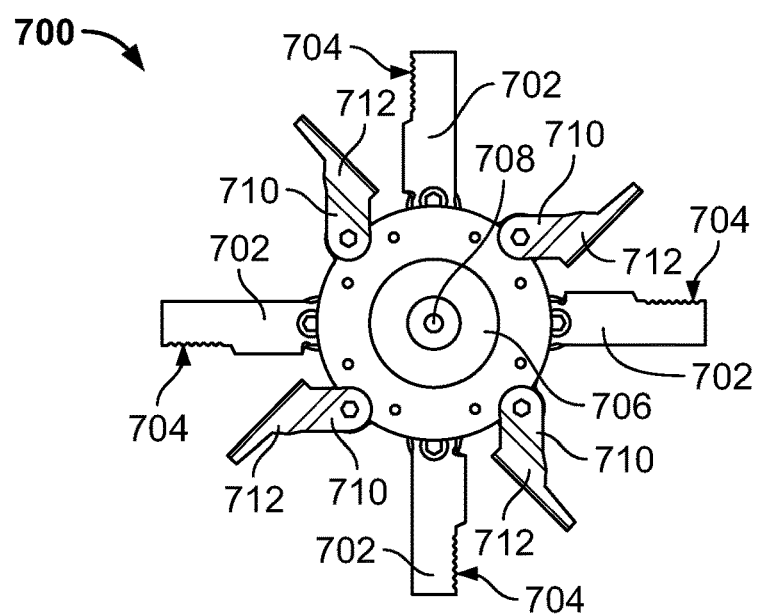
FIG. 7 is a front view of a second embodiment of a chopper rotor assembly.

In an alternative embodiment, a chopper rotor assembly 204 may include a chopper rotor 700 similar to the one depicted in FIG. 7. Here, the chopper rotor 700 is shown with a plurality of thin, flat blades 702 similar to those in FIG. 6. These thin, flat blades 702 may be substantially straight and include at least a portion of one surface having a sharpened portion 704 with a plurality of teeth for performing a chopping function. In addition to the plurality of chopper blades 702, the chopper rotor 700 may also include at least one fan blade 710. Although four fan blades 710 are shown in FIG. 7, another embodiment of the chopper rotor 700 may only include a single fan blade 710. An alternative embodiment of the chopper rotor 700 may include several fan blades 710 spaced along the width of the chopper rotor 700. In any event, the at least one fan blade 710 may include a bent portion 712 that may perform an air moving function (i.e., generate an additional air stream). The bent portion 712 may be angled at approximately 90°, but the angle of the bent portion 712 may be predisposed at any desirable angle. In some embodiments, the angle may be relatively small (e.g., less than 10°) so that the chopper rotor 700 does not push a significant amount of air forward into the combine and create back pressure therein. The chopper rotor 700 may further include a hub 706 about which the blades 702 and fan blades 710 rotate relative to a rotation axis 708.

Referring to FIG. 3, a rear portion of another embodiment of a combine 300 is shown. Here, a chopper housing 302 and a chopper rotor assembly 304 are illustrated. The chopper housing 302 may be formed of a pair of opposing side walls 316. In FIG. 3, only one side wall 302 is shown and the other is removed to better illustrate the features of the combine inside of the chopper housing 302. In addition to the side walls 316, the housing 302 may include a floor or inlet floor 318. The inlet floor 318 may be angled or declined such that air is able to flow over the inlet floor 318 and into the chopper rotor assembly 304. The inlet floor 304 defines a portion of an inlet 320 to the chopper housing 302.

The combine 300 may include a roof or rear hood 324 which is disposed forward of the chopper rotor assembly 304. Air from the separating section 44 and the sieves 48, 50 may be directed into contact or toward the rear hood 324. As shown, the rear hood 324 may be angled or oriented in a downward and rearward direction in FIG. 3 thereby directing the air flow towards the inlet 320 of the chopper housing 302.

The combine 300 may further include side walls 332 which, in combination with at least the rear hood 324, defines an interior thereof. The side walls 316 of the chopper housing 302 may be complementary with and generally coplanar with the side walls 332 of the combine 300. In other words, the chopper housing 302 may have a similar width as that of the combine 300.

The chopper rotor assembly 304 may include a chopper rotor 306 for chopping the residue received from the cleaning system. The chopper rotor 306 may include a central hub 308 and a plurality of blades 312 coupled thereto and protruding radially therefrom. Each of the plurality of blades 312 may be spaced relative to one another in an arrangement along the width of the chopper rotor 306. The chopper rotor 306 is disposed within the chopper housing 302 and may rotate in a counterclockwise direction about a pivot axis 310. The outer edge of the plurality of blades 312 define an outer circumference or boundary during rotation. Each of the plurality of blades 312 may include a sharpened portion with a plurality of teeth 314 for chopping the residue received from the cleaning system 28. In the embodiment of FIG. 3, there are teeth 314 on both sides of each blade 312. In other embodiments, however, there may only be teeth formed on the side of the blade configured to come into contact with the residue as the chopper rotor 306 rotates in the counterclockwise direction about the pivot axis 310.

Although not shown in FIG. 3, in one embodiment the chopper rotor assembly 304 may also include one or more stationary blades affixed to the inlet floor 318 of the chopper housing 302. In this embodiment, the stationary blades may be arranged in a direction of the width of the chopper rotor 306 and spaced accordingly such that the stationary blades do not come into contact with the blades 312 of the chopper rotor 306. Interaction between the plurality of blades 312 of the chopper rotor 306 and the stationary blades can create a chopping action. In the illustrated embodiment of FIG. 3, however, there are no stationary blades shown.

As material is chopped by the chopper rotor 306, the material or residue is blown further rearward through an outlet or discharge outlet 322 of the chopper housing 302 until it is engaged by a spreader 342. The spreader 342 may include one or more blades or paddles for spreading the material rearward of the combine 300 where the material may be collected or picked up by another machine or vehicle. Any known type of spreader or tailboard may be used for purposes of this disclosure.

In the embodiment of FIG. 3, there are no rear vents defined in the rear hood 324 similar to those in conventional combine harvesters. In other words, there is no means for venting air from the enclosed combine 300 upstream of the chopper rotor assembly 304 through the rear hood 324. In at least one embodiment, there may not be any vent located downstream from the cleaning system 28 and upstream of the chopper rotor 306. Instead, air flow is forced to flow through the chopper rotor 306 and discharge through the outlet 322 of the chopper housing 302. As shown, air generated by the blower 46 may follow a first portion of a flow path defined by arrow 340. The flow path may partially be defined along the rear hood 324 and it also may flow along the floor inlet 318. The entirety of the air flow from the blower 46 therefore passes through the inlet 320 of the chopper housing 302 and out of the interior of the combine 320 via the outlet 322, which is contrary to many conventional combine designs such as the one described in the '315 patent.

In the illustrated embodiment of FIG. 3, the chopper housing 302 may also include a chopper roof structure 326 which is located above the chopper rotor 306. The chopper roof structure 326 may have a portion thereof which is substantially flat, as shown in FIG. 3. In particular, the chopper roof structure 326 of FIG. 3 may include a first section 334 which is angled downwardly towards a rear of the combine. The first section 334 may be coupled to the side walls 316 of the chopper housing 302 via a first mounting bracket 328. A second section 336 of the chopper roof structure 326 may be angled downwardly towards a front of the combine 300. The second section 336 may be coupled to the side walls 316 of the chopper housing 302 via a second mounting bracket 330. Alternatively, the first mounting bracket 328 and the second mounting bracket 330 may be coupled to the side walls 332 of the combine 300.

A third section 338 may be coupled between the first section 334 and the second section 336 of the chopper roof structure 326. As shown in FIG. 3, the third section 338 is disposed directly above the chopper rotor 306 and in close proximity to the blade 312 of the chopper rotor 306. Similar to the embodiment of FIG. 2, the distance or gap between the third section 338 of the chopper roof structure 326 and the chopper rotor 306 is minimally sized for tolerance reasons. Otherwise, the gap, d, is ideally as small as possible so long as the blades 312 do not contact the chopper roof structure 326 during rotation about their axis 310.

The chopper roof structure 326 may be arranged to extend across the entire width of the chopper housing 302 or combine 300. Thus, with the chopper roof structure 326 being in close proximity to the blades 312 of the chopper rotor 306, air flow generated by the blower 46 passes through the inlet 320 of the chopper housing 302 and through the chopper rotor 306 before escaping through the outlet 322 of the combine 300. The air flow does not generally flow above the chopper rotor 306 due to the shape and arrangement of the chopper roof structure 326, and therefore it is directed through the chopper rotor 306 and between the plurality of blades 312.

Figure 4:
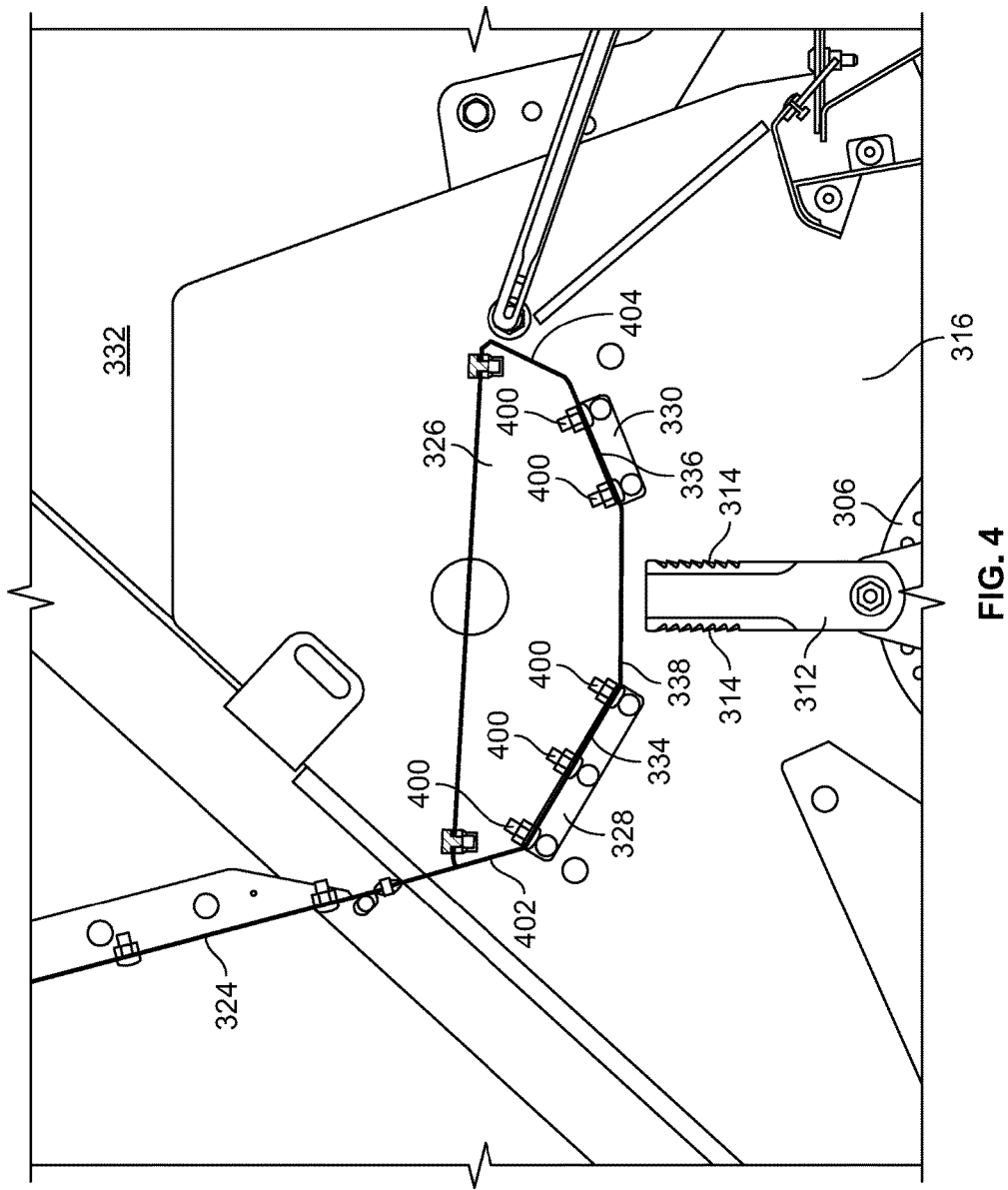
FIG. 4 is an enlarged partial section of a side view of the partially flat chopper roof structure.

As also shown in FIG. 4, the chopper roof structure 326 may further include additional sections. For example, a fourth section 402 may be angled relative to the first section 334. The fourth section 402 may be coplanar with the rear hood 324. The chopper roof structure 326 may also include a fifth section 404 that is angled relative to the second section 336. Additional sections may be provided in other embodiments. As shown, fasteners 400 may be used to couple the mounting brackets to the side walls of the chopper housing 302 or the combine 300. The fasteners may include screws, bolts, washers, nuts, nails, or any other known type of fastener.

Figure 5:
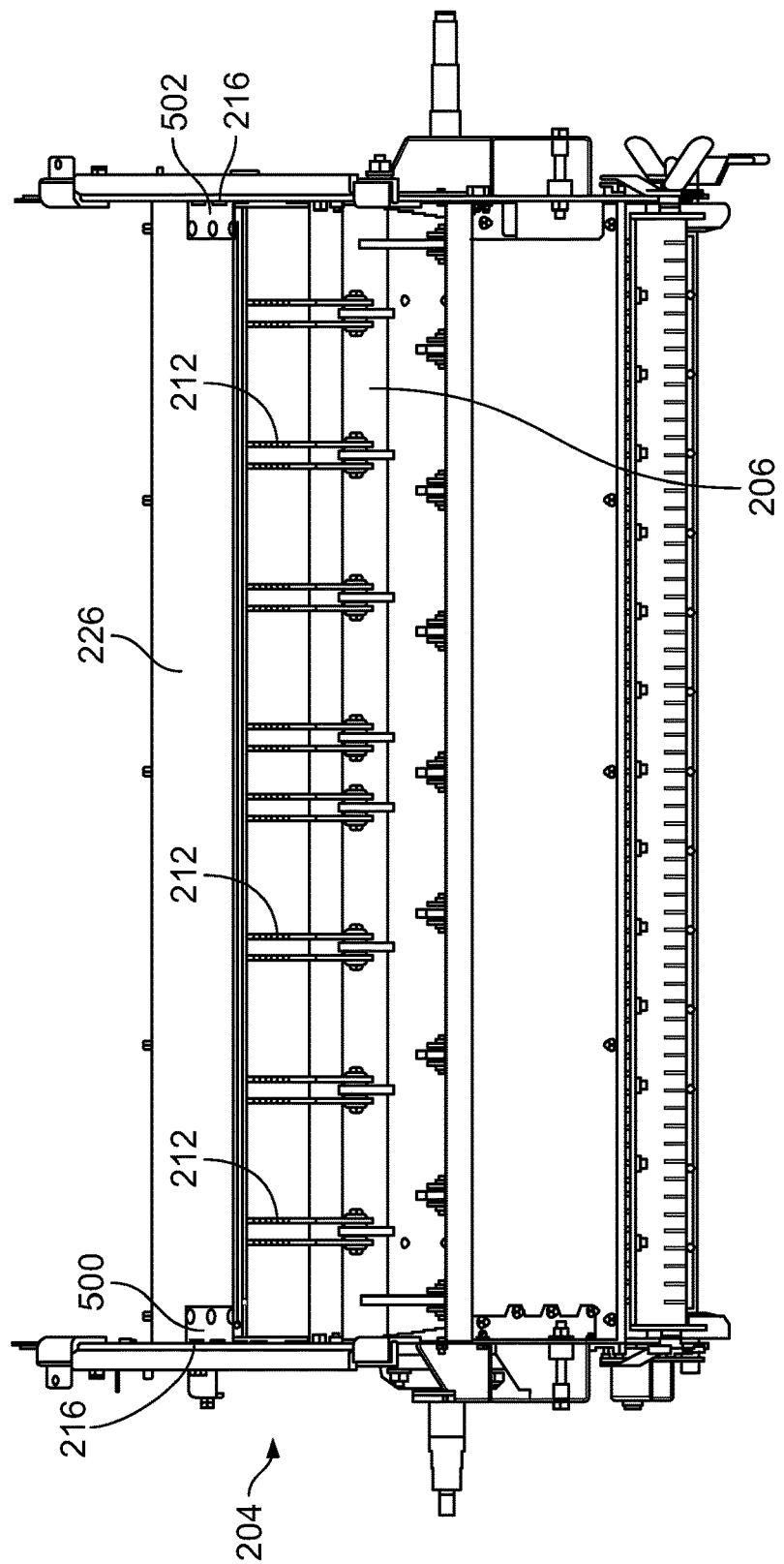
FIG. 5 is a rear section view of a chopper rotor assembly.

A further illustrative example of the combine chopper rotor assembly 204, 304 is shown in FIG. 5. While the chopper rotor assembly 204 of FIG. 2 is shown in FIG. 5, it is understood that the same principles and teachings may be applied to the chopper rotor assembly 304 of FIG. 3 or any other chopper rotor assembly that falls within the teachings of the present disclosure. As shown in FIG. 5, the chopper rotor 206 extends the width of the chopper housing 202. A first mounting bracket 500, which may be similar to the first mounting bracket 228 of FIG. 2, may be used to couple the chopper roof structure 226 to a first side wall 216 of the chopper housing 202. A second mounting bracket 502, which may be similar to the second mounting bracket 230 of FIG. 2, may be used to couple the chopper roof structure 226 to an opposite side wall 216 of the chopper housing 202. In an alternative embodiment, the first mounting bracket 500 and the second mounting bracket 502 may couple the chopper roof structure 226 to the side walls 232 of the combine 200. In a further embodiment, additional mounting brackets may be used to couple the chopper roof structure 226 to the side walls 216 of the chopper housing 202 and the side walls 232 of the combine 200.

As also shown in FIG. 5, the plurality of blades 212 of the chopper rotor 206 are shown having a minimal thickness and a substantially flat profile. For purposes of this disclosure, the substantially flat profile refers to the blades having a flat and smooth surface on each side thereof. Unlike fan blades or wing blades which usually have a bent portion of the blade for aiding in pushing or moving air as the blades rotate, the substantially flat profile blades 212 described herein do not have a bent portion but rather remain flat with minimal thickness along the length thereof. Moreover, while the embodiment of FIG. 5 illustrates the chopper rotor 206 as having only flat profile blades 212, it is contemplated within this disclosure that a different embodiment of the chopper rotor 206 may include at least one fan blade. Even with the at least one fan blade, however, the chopper rotor 206 is not configured to generate an additional air stream as it rotates about its axis 210. If there is more than one fan blade and a relatively small air stream is generated by the rotation of the more than one fan blade, the air stream may still be minimal compared to the air flow generated by the blower 48 and the air streams generated by conventional combines which include rotors with a plurality of fan blades. Further, even with one or more fan blades, the chopper rotor 206 does not substantially inhibit the air flow from flowing through the chopper rotor 206 and discharging out of the interior of the combine 200 through the outlet 222. For example, the bent portion of the more than one fan blades may be bent at a small angle (e.g., less than 30°) so as to not inhibit air flow or redirect the air flow passing through the chopper rotor 206.

In a further embodiment of the present disclosure, the chopper housing of a combine may include a chopper roof structure having a cross-section other than those shown in FIGS. 2-4. In other words, the chopper roof structure may have designs other than being substantially V-shaped (FIG. 2) or partially flat (FIGS. 3-4). In particular, the chopper roof structure may be inclusive of any shape or design so long as the roof structure is disposed in close proximity to the chopper rotor such that air flow escapes by flowing through the chopper rotor and not around the top of the rotor or vented upstream from the chopper rotor.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A combine harvester, comprising:
a housing including a rear hood and opposite side walls which define an interior;
a blower disposed in the interior of the housing, the blower configured to generate an air stream in a substantially rearward direction;
a cleaning system disposed in the interior at a location rearward of the blower, the cleaning system separating residue from a crop material such that the residue is transported via the air stream rearwardly to be discharged from the housing;
a chopper rotor assembly disposed within the interior and comprising a chopper rotor mounted about a hub for rotation about an axis defined by the hub and a plurality of blades coupled to the hub of the chopper rotor for chopping the residue as it is received via the air stream;
a chopper housing disposed within the interior and defining an inlet opening for receiving the residue being transported via the air stream from the cleaning system and an outlet spaced rearward from the chopper rotor for discharge of the chopped residue from the interior of the housing; and
a roof structure of the chopper housing located above the chopper rotor, the roof structure being disposed in close proximity to the chopper rotor such that a minimally-sized gap is defined therebetween, wherein the roof structure extends from the rear hood, across the chopper rotor assembly, and toward the outlet, the roof structure including a lowermost portion thereof disposed directly above the chopper rotor assembly;
wherein, the air stream generated by the blower flows out of the interior via a flow path defined through the chopper rotor without being substantially redirected from flowing in the rearward direction by the plurality of blades of the chopper rotor.

2. The combine harvester of claim 1, wherein, due to the size of the gap defined between the roof structure and chopper rotor, the air stream flows through the chopper rotor to be discharged from the interior without flowing above the chopper rotor and through the gap.

3. The combine harvester of claim 1, wherein the gap is less than two inches.

4. The combine harvester of claim 1, wherein the chopper housing comprises a floor and a pair of side walls opposite one another, the chopper housing being open at the rear of the chopper rotor to permit the air stream to flow substantially unrestricted through the chopper rotor and out of the interior.

5. The combine harvester of claim 1, wherein the rear hood is free of any opening or vent such that the air flow is directed rearward via the rear hood without escaping from the interior upstream of the chopper rotor.

6. The combine harvester of claim 5, wherein the housing does not include a vent between the cleaning system and the chopper rotor for venting the air stream upstream of the chopper rotor.

7. The combine harvester of claim 1, wherein each of the plurality of blades is substantially straight and comprises a substantially flat profile so as to chop the residue without producing an additional air stream as the chopper rotor rotates about the hub.

8. The combine harvester of claim 1, wherein the chopper rotor does not include any tan blades coupled to the hub.

9. The combine harvester of claim 1, wherein each of the plurality of blades is a chopper blade and further comprising at least one fan blade coupled to the hub of the chopper rotor, the at least one fan blade including a bent portion for generating an additional air stream in the interior of the housing.

10. The combine harvester of claim 1, wherein the roof structure is coupled to the side walls of the chopper housing or the side walls of the housing.

11. The combine harvester of claim 1, wherein the roof structure comprises a first section and a second section that converge to define a lowermost point of the lowermost portion to form a substantially V-shaped structure, wherein the roof structure includes first and second portions on either side of the lowermost portion and each of the first and second portions extend upwardly from the lowest portion and away from the chopper rotor assembly.

12. The combine harvester of claim 11, wherein the gap is defined between the lowermost point of the roof structure and the chopper rotor.

13. The combine harvester of claim 1, wherein the lowermost portion of the roof structure comprises a first section that is substantially flat, the gap being defined between the first section and the chopper rotor.

14. The combine harvester of claim 13, wherein the roof structure comprises a second section that is coplanar with the rear hood.

15. A combine harvester, comprising:
a housing including a rear hood and opposite side walls which define an interior;
a blower disposed in the interior of the housing, the blower configured to generate an air stream in a substantially rearward direction;
a cleaning system disposed in the interior at a location rearward from the blower, the cleaning system separating residue from a crop material such that the residue is transported via the air stream rearwardly to be discharged from the housing;
a chopper rotor assembly disposed within the interior and comprising a chopper rotor mounted about a hub for rotation about an axis defined by the hub and a plurality of blades coupled to the hub of the chopper rotor for chopping the residue as it is received via the air stream;
each of the plurality of blades being substantially straight and comprising a substantially flat profile so as to chop the residue without producing an additional air stream as the chopper rotor rotates about the hub;
a chopper housing disposed within the interior and defining an inlet opening of the chopper rotor assembly for receiving the residue and an outlet spaced rearward from the chopper rotor for discharge of the chopped residue from the interior of the housing; and
a roof structure of the chopper housing located above the chopper rotor, the roof structure being disposed in close proximity to the chopper rotor such that a minimally-sized gap is defined therebetween, wherein the roof structure extends from the rear hood, across the chopper rotor assembly, and toward the outlet, the roof structure including a lowermost portion thereof disposed directly above the chopper rotor assembly;
wherein, the air stream generated by the blower flows into the chopper housing via the inlet, through the chopper rotor without being substantially redirected from flowing in the rearward direction by the plurality of blades of the chopper rotor, and vented further rearwardly out of the interior via the outlet.

16. The combine harvester of claim 15, wherein the chopper housing comprises a floor and a pair of side walls opposite one another, the chopper housing being open at the rear of the chopper rotor to permit the air stream to flow substantially unrestricted through the chopper rotor.

17. The combine harvester of claim 15, wherein the housing does not include a vent between the cleaning system and the chopper rotor for venting the air stream upstream of the chopper rotor.

18. The combine harvester of claim 15, wherein the chopper rotor does not include any fan blades coupled thereto.

19. A combine harvester, comprising:
a housing including a rear hood and opposite side wall which define an interior;
a blower disposed in the interior of the housing, the blower configured to generate an air stream in a substantially rearward direction;
a cleaning system disposed in the interior at a location rearward from the blower, the cleaning system separating residue from a crop material such that the residue is transported via the air stream rearwardly to be discharged from the housing;
a chopper rotor assembly disposed within the interior at a location below and rearward of the rear hood of the housing, the chopper rotor assembly comprising a chopper rotor mounted about a hub for rotation about an axis defined by the hub and a plurality of blades coupled to the hub of the chopper rotor for chopping the residue as it is received via the air stream;
a chopper housing disposed within the interior and defining an inlet opening of the chopper rotor assembly for receiving the residue and an outlet spaced rearward from the chopper rotor for discharge of the chopped residue from the interior of the housing, the chopper housing including a floor, a pair of side wall, and being substantially open at the rear of the chopper rotor; and
a roof structure of the chopper housing located above the chopper rotor and coupled to either the housing or the chopper housing, the roof structure being disposed in close proximity to the chopper rotor such that a minimally-sized gap is defined therebetween, wherein the roof structure extends from the rear hood, across the chopper rotor assembly, and toward the outlet, the roof structure including a lowermost portion thereof disposed directly above the chopper rotor assembly;
wherein, the air stream generated by the blower flows out of the interior via a flow path defined through the chopper rotor without being substantially redirected from flowing in the rearward direction by the plurality of blades of the chopper rotor;
wherein, the housing does not include a vent between the cleaning system and the chopper rotor for venting the air stream upstream of the chopper rotor.

20. The combine harvester of claim 19, wherein each of the plurality of blades is substantially straight and comprises a substantially flat profile so as to chop the residue without producing an additional air stream as the chopper rotor rotates about the hub.

* * * * *